(12) United States Patent
Peterson et al.

(10) Patent No.: US 8,947,888 B2
(45) Date of Patent: Feb. 3, 2015

(54) SUBSTANTIALLY RIGID INTERCONNECTION STRUCTURE FOR DEVICES

(71) Applicant: Microsoft Corporation, Redmond, WA (US)

(72) Inventors: Eric C. Peterson, Woodinville, WA (US); David T. Harper, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 147 days.

(21) Appl. No.: 13/716,223

(22) Filed: Dec. 17, 2012

(65) Prior Publication Data

US 2014/0170865 A1    Jun. 19, 2014

(51) Int. Cl.
H01R 12/50    (2011.01)
H01R 43/20    (2006.01)
H04Q 1/02     (2006.01)

(52) U.S. Cl.
CPC .............. H01R 23/70 (2013.01); H01R 43/205 (2013.01); H04Q 1/155 (2013.01)
USPC ............ 361/789; 361/785; 361/776; 361/790

(58) Field of Classification Search
USPC ...................... 361/789, 785, 776, 790; 439/61
See application file for complete search history.

(56) References Cited

U.S. PATENT DOCUMENTS

| | | | |
|---|---|---|---|
| 6,606,656 B2 | 8/2003 | Carvey et al. | |
| 7,121,859 B2 | 10/2006 | Van Schuylenbergh et al. | |
| 7,643,468 B1 | 1/2010 | Arregoces et al. | |
| 7,712,211 B2 * | 5/2010 | Chia et al. ................. | 29/841 |
| 8,022,537 B2 * | 9/2011 | Akamine et al. ............ | 257/728 |
| 8,038,451 B2 | 10/2011 | Peterson et al. | |
| 8,160,063 B2 | 4/2012 | Maltz et al. | |
| 2003/0078997 A1 | 4/2003 | Franzel | |
| 2005/0191056 A1 | 9/2005 | Coffey | |
| 2006/0232949 A1 | 10/2006 | Osaka | |
| 2007/0238326 A1 | 10/2007 | Fallah-Adl et al. | |

OTHER PUBLICATIONS

Liao, et al., "DPillar: Scalable Dual-Port Server Interconnection for Data Center Networks", Retrieved Aug. 28, 2012 at <<http://ieeexplore.ieee.org/stamp/stamp.jsp?tp=&arnumber=5560132>>, In the Proceedings of 19th International Conference on Computer Communications and Networks (ICCCN), 2010, Aug. 5, 2010, pp. 6.

Mysore, et al., "PortLand: A Scalable Fault-Tolerant Layer 2 Data Center Network Fabric", Retrieved Aug. 28, 2001 at <<http://cseweb.ucsd.edu/~vandat/papers/portland-sigcomm09.pdf>>, In Proceedings of the ACM SIGCOMM 2009 conference on Data communication, Aug. 17, 2009, pp. 39-50.

(Continued)

*Primary Examiner* — Andargie M Aychillhum
(74) *Attorney, Agent, or Firm* — Judy Yee; Steve Wight; Micky Minhas (57) ABSTRACT

A substantially cable-free board connection assembly may include a plurality of printed circuit boards (PCBs) forming an interconnect plane for a plurality of electronic devices respectively attached to a plurality of plane boards included in the interconnect plane. An insertion direction for substantially all connectors is substantially perpendicular to a face of the interconnect plane. At least a portion of the board connection assembly is mounted to a support structure via a flexible connection.

20 Claims, 12 Drawing Sheets

(56) References Cited

OTHER PUBLICATIONS

Li, et al., "FiConn: Using Backup Port for Server Interconnection in Data Centers", Retrieved Aug. 28, 2001 at <<http://research.microsoft.com/en-us/people/danil/ficonn_infocom09.pdf>>, In the 28th Conference on Computer Communications. IEEE in INFOCOM 2009, Apr. 19, 2009, pp. 2276-2285.

"International Search Report & Written Opinion for PCT Application No. PCT/US2013/075614", Mailed Date: May 30, 2014, Filed Date: Dec. 17, 2013, 10 Pages.

* cited by examiner

SUBSTANTIALLY RIGID INTERCONNECTION STRUCTURE FOR DEVICES

BACKGROUND

Large scale electronic device configurations such as configurations within data centers utilize network communication arrangements to provide device-to-device interconnections and to provide communication between devices and external entities such as entities accessible via the Internet. Current electronic devices continue to demand greater bandwidth interconnect between systems. For example, communications solutions may utilize fat tree network schemes for server to server and server to web (e.g., the Internet) connections.

SUMMARY

According to one general aspect, a system may include a board connection assembly that includes a plurality of substantially cable-free interconnection modules. Each respective interconnection module may include a printed circuit board (PCB) plane board that is substantially rigidly connected to at least one respective electronic device. A plurality of connecting PCBs may be configured to provide substantially all network communication connectivity to the interconnection modules in lieu of flexible cabling. At least a portion of the board connection assembly may be mounted to a support structure via a flexible connection.

According to another aspect, a method includes interconnecting a system of printed circuit boards (PCBs) that are interconnected to form a single assembly that is substantially cable-free for interconnecting a plurality of electronic devices. A plurality of substantially cable-free interconnection modules are obtained, each respective interconnection module including a plane board that is substantially rigidly connected to at least one respective electronic device. Substantially in a first direction, the interconnection modules are connected via substantially rigid pairwise connections of pairs of the plane boards via a plurality of respective horizontal ties and horizontal loopback boards. Substantially in a second direction, the interconnection modules are connected via substantially rigid pairwise connections of pairs of the plane boards via a plurality of respective vertical ties and vertical loopback boards. The second direction is substantially perpendicular to the first direction. At least a portion of the single assembly may be flexibly mounted to a support structure.

According to another aspect, a system may include a substantially cable-free board connection assembly that includes a plurality of printed circuit boards (PCBs) forming an interconnect plane for a plurality of electronic devices respectively attached to a plurality of plane boards included in the interconnect plane. An insertion direction for substantially all connectors is substantially perpendicular to a face of the interconnect plane. At least a portion of the board connection assembly may be mounted to a support structure via a flexible connection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIGS. 1a-1l are block diagrams of an example system for interconnecting electronic devices.

DETAILED DESCRIPTION

I. Introduction

Electronic device configurations such as configurations within data centers utilize network communication arrangements to provide device-to-device interconnections and to provide communication between devices and external entities such as entities accessible via the Internet. As an example, network configurations based on a torus provide significant interconnectivity performance, but may involve a substantial amount of interconnectivity which may be accomplished via cabling for interconnection communications. This type of system may involve elaborate techniques for managing and servicing the cables. Servicing of systems with substantial numbers of flexible cables leads to confusion, resulting in errors in connections when attempting to attach or replace the communication cables.

Example techniques discussed herein provide device interconnections, which are manufacturable, lower cost, serviceable and repeatable.

An example system as discussed herein may include a system of printed circuit boards (PCBs) that are interconnected to form a single assembly. For example, a central feature of the system may include a plane board (e.g., backplane/midplane board) where all electronic devices (e.g., servers, storage devices) connect. For example, a series of boards may be used to interconnect multiple backplanes to form the complete assembly. For example, horizontal ties and horizontal loopback boards may provide horizontal connections, while vertical ties and vertical loopback boards may provide vertical connections. For example, these 5 boards may be directly connected together to form a larger assembly, for example, to connect over 4,000 servers with approximately 70,000 link connections, substantially without the use of cables.

For example, the boards may be mounted to a spine structure to form vertical groups. This spine may provide a mounting structure for support and tolerance control for the plane boards (e.g., midplane/backplane), vertical ties and loopback boards. A vertical support that attaches perpendicular to the spine may provide a structural element for mounting of the electronic devices.

For example, a bottom and top structural element may be used to provide a reference for tolerance control along the length of the system. The spine and vertical support structures may be attached to the top and bottom structures to develop the entire system structure. For example, substantially all of the boards used to form a backplane/midplane structure may be passive to improve reliability. The plane boards may be attached in a manner that will allow for replacement of the plane boards with minimal system disassembly.

For example, a power distribution system may be located in the vertical structural element. The power distribution system may include bulk power supplies, batteries, control systems and AC/DC power distribution elements. For example, the power supply outputs may be connected together to form a single power domain. In this fashion, N+1 supplies may be achieved with minimal over provision of power.

In this context, a "backplane" may refer to a Printed Circuit Board (PCB) that interconnects IT cards wherein the IT cards are located on only one surface of the board. In this context, a "midplane" may refer to a PCB that interconnects IT cards wherein the IT cards are located on both the front and rear surface of the board. In this context, a "midplane structure" may refer to a set of PCBs including backplanes, midplanes and/or interconnecting boards forming a structure that interconnects IT cards where the IT cards are located on both the front and back of the structure.

In this context, references to "horizontal" ties and "horizontal" loopback boards are not intended be construed as limiting only to a "horizontal" direction, as it may be very easy to simply rotate a board slightly from a "horizontal" stance to a "vertical" stance (or positions in between), and vice versa. Similarly, references to "vertical" ties and "vertical" loopback boards are not intended be construed as limiting only to a "vertical" direction.

In this context, "ties" and "loopback boards" are intended to include PCBs that may be configured for interconnecting other PCBs, as discussed further herein.

II. Example System Environment

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

As further discussed herein, FIG. 1 is a block diagram of an example system 100 that includes a substantially rigid interconnection structure for devices. As shown in FIGS. 1*a*-1*c*, the system 100 may include a board connection assembly 102 that includes a plurality of substantially cable-free interconnection modules 104. Each respective interconnection module 104 may include a printed circuit board (PCB) plane board 106 that is substantially rigidly connected to at least one respective electronic device 108. For example, the plane board 106 may include at least one connection point 112 configured to accept the electronic device 108. A plurality of connecting PCBs 110 may be configured to provide substantially all network communication connectivity to the interconnection modules 104 in lieu of flexible cabling.

Figure 1A:
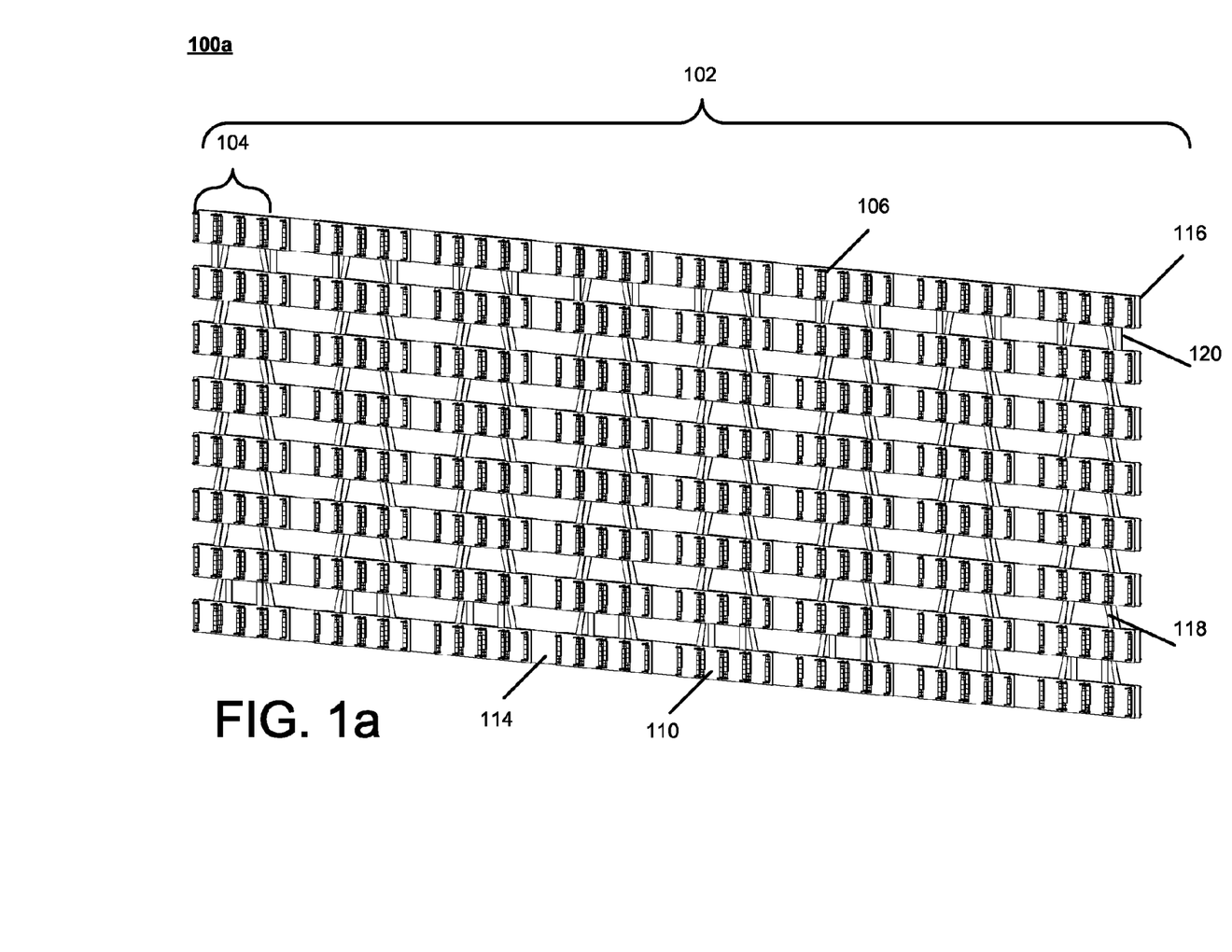
Figure 1B:
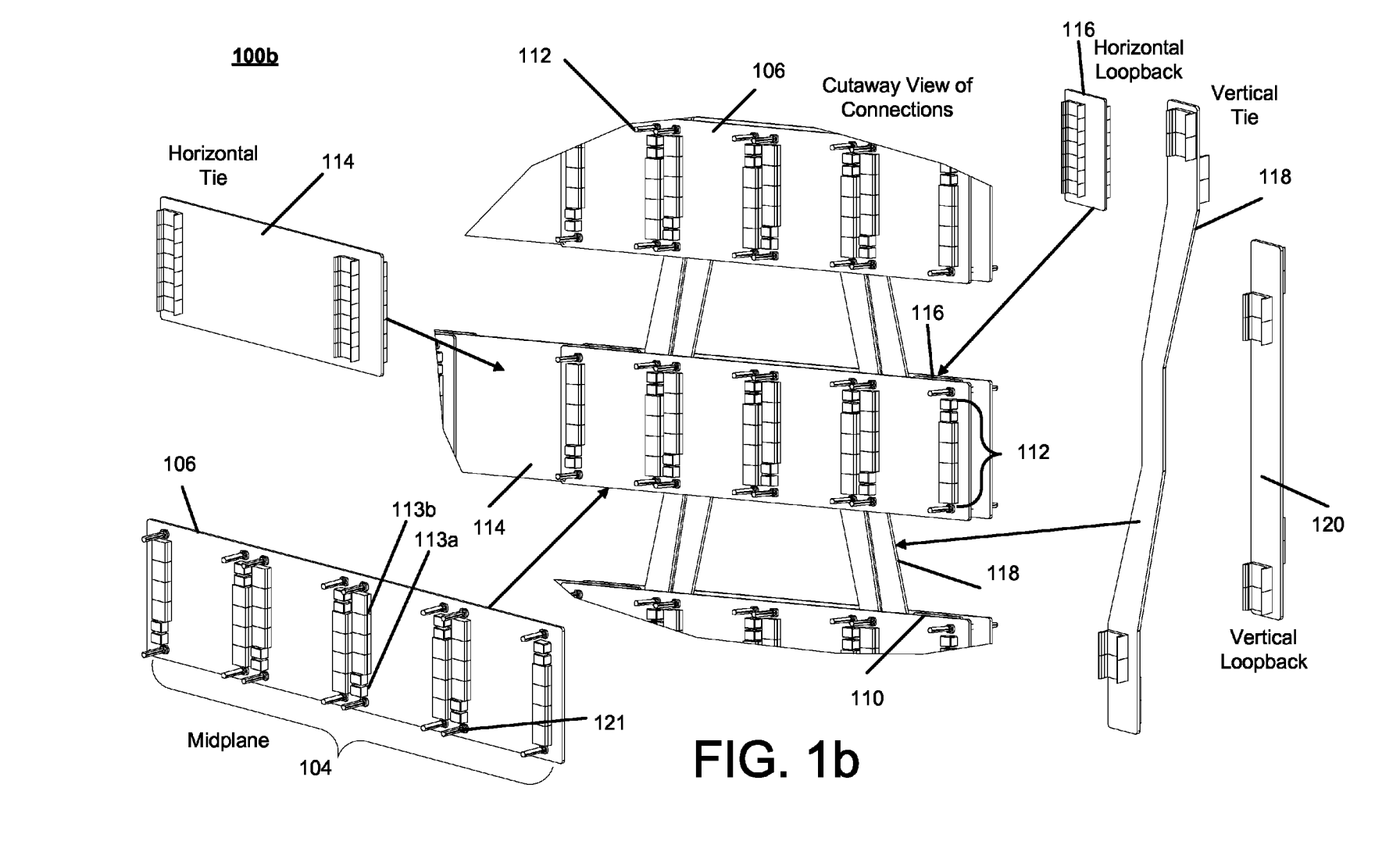

According to an example embodiment (e.g., as shown in FIG. 1*b*, which includes a cutaway view of the connections shown in FIG. 1*a*), each connection point 112 may include an electrical connection point 113*a* and a signal connection point 113*b*.

Figure 1C:
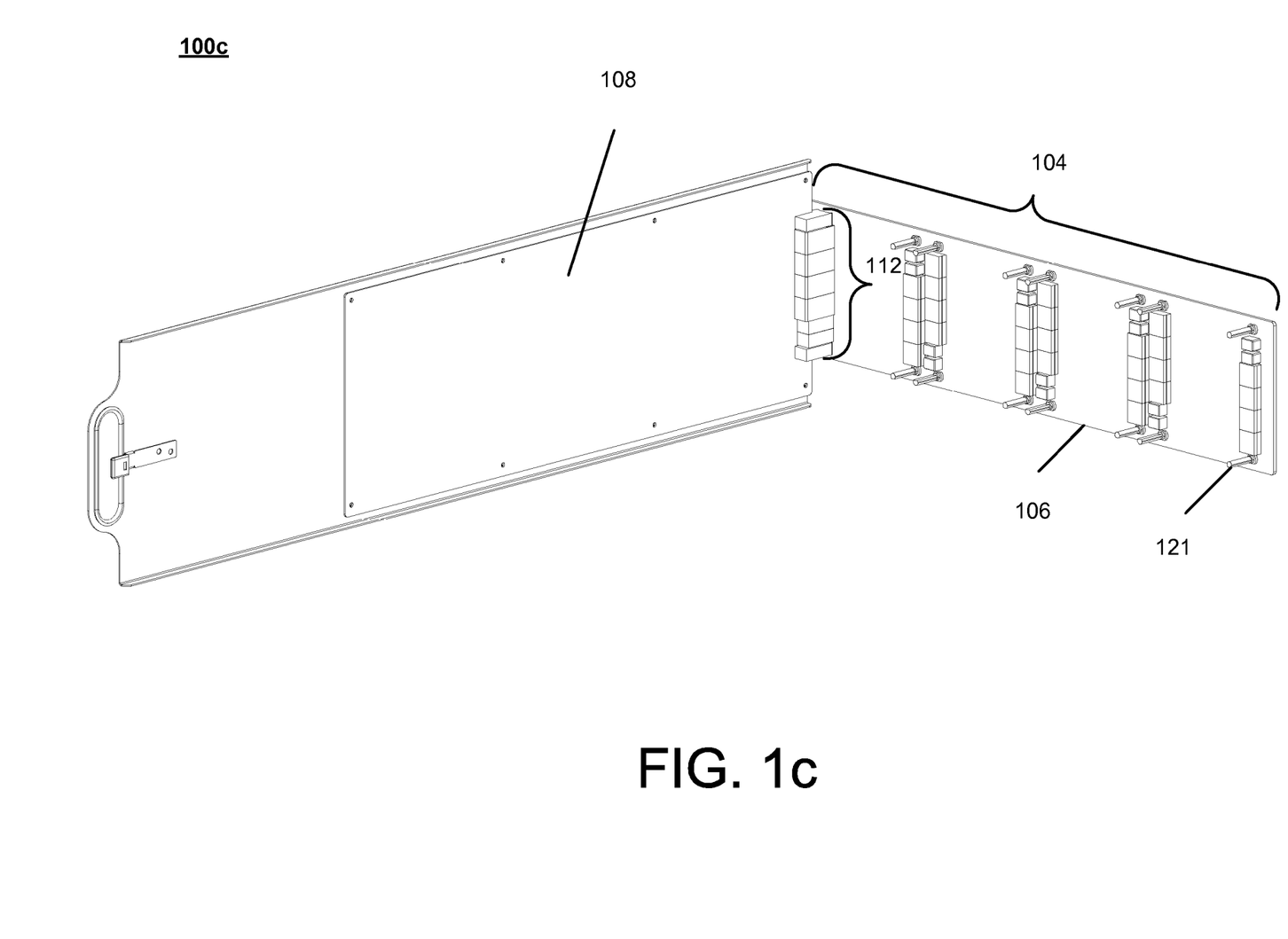

As shown in FIG. 1*c*, the electronic device 108 may include a card that may be inserted into a connection point 112.

At least a portion of the board connection assembly 102 may be mounted to a support structure 122 via a flexible connection, as discussed further below.

For example, the system 100 may include a substantially cable-free board connection assembly 102 that includes a plurality of printed circuit boards (PCBs) 110 forming an interconnect plane for a plurality of electronic devices 108 respectively attached to a plurality of plane boards 106 included in the interconnect plane, with an insertion direction for substantially all connectors 112 being substantially perpendicular to a face of the interconnect plane.

For example, connections in a first direction among the interconnection modules 104 may be provided by a plurality of horizontal ties 114 and horizontal loopback boards 116. For example, the first direction may be a horizontal direction or a vertical direction. One skilled in the art of electronic devices will appreciate that a configuration may be implemented in many different directions, without departing from the spirit of the discussion herein. Further, references to "horizontal" ties and "horizontal" loopback boards are not intended to be construed as limiting only to a "horizontal" direction, as it is very easy to simply rotate a board slightly from a "horizontal" stance to a "vertical" stance (or positions in between), and vice versa.

For example, connections in a second direction among the interconnection modules are provided by a plurality of vertical ties 118 and vertical loopback boards 120. The second direction is substantially perpendicular to the first direction. For example, substantially all connectors 112 among the PCBs included in the system may be secured in a direction that is perpendicular to respective faces of the interconnection module PCB plane boards 106. For example, the flexible connection may allow movement in the first direction and the second direction.

For example, horizontal connections among the PCBs 110 may be provided by horizontal ties 114 and horizontal loopback boards 116, and vertical connections among the PCBs may be provided by vertical ties 118 and vertical loopback boards 120.

According to an example embodiment, as shown in FIG. 1*b*, the vertical ties 118 may be configured to connect with a connection point on a first interconnection module 104, to not connect with an adjacent, second interconnection module 104, and to connect with a next adjacent interconnection module 104 (i.e., skipping connections between adjacent interconnection modules 104). As shown in FIG. 1*b*, the vertical ties 118 are connected on the backsides of the respective interconnection modules 104 (e.g., on respective opposite sides of the interconnection modules 104 from connections to the electronic devices 108), forming a "sandwich" type connection between the respective interconnection modules 104.

Similarly, the vertical loopback boards 120, horizontal ties 114 and horizontal loopback boards 116 may be connected on the backsides of the respective interconnection modules 104 (e.g., on respective opposite sides of the interconnection modules 104 from connections to the electronic devices 108).

Figure 1D:
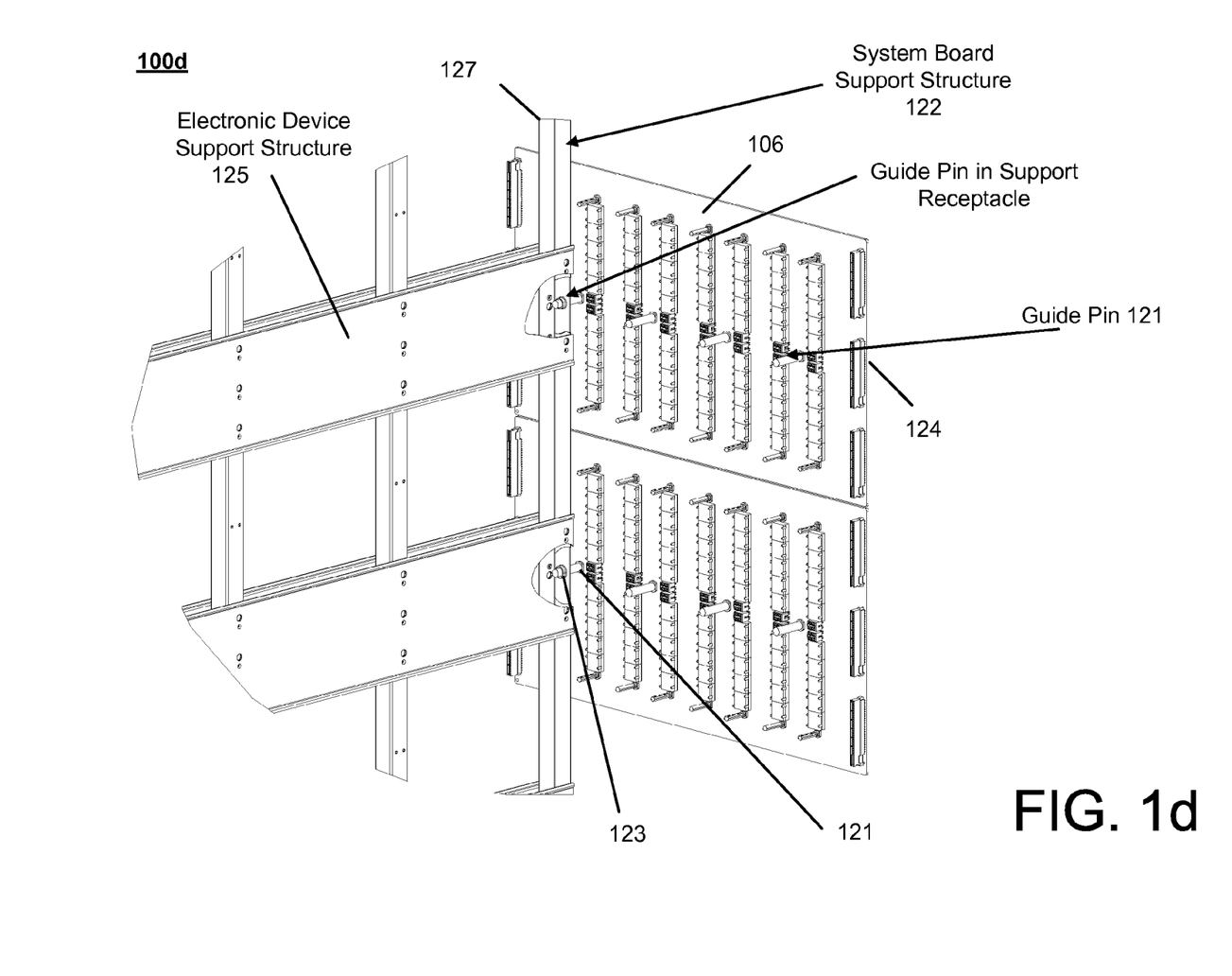

For example, as shown in FIG. 1*d*, a support structure 122 may be configured to provide a mounting structure for support and tolerance control for at least a portion of the electronic devices 108. For example, the plane board 106 may include guide pins 121 configured to mate with a receptacle 123 on the support structure 122 for primary alignment in all directions substantially parallel to the plane boards, or a slot for secondary alignment in a direction perpendicular to the plane of the support structure. For example, an outer edge of the support structure 122 may be configured to rest on a cabinet bottom side. For example, the support structure 122 may be aligned to attached boards via a center guide pin 121 so that the support structure 122 may "float" with the boards. For example, the receptacle 123 may include a single round hole, or oval or elliptical slots. For example, one receptacle may be round, with others being shapes other than round, to provide partial for rotational movement, in lieu of fixed mating positions (e.g., for tolerance control).

For example, an electronic device support structure 125 may be connected to the support structure to provide support for the electronic devices 108. For example, the electronic devices 108 (e.g., cards) may slide in along ridges in the electronic device support structure 125 to connect with the connection points 112 on the plane boards 106.

Figure 1E:
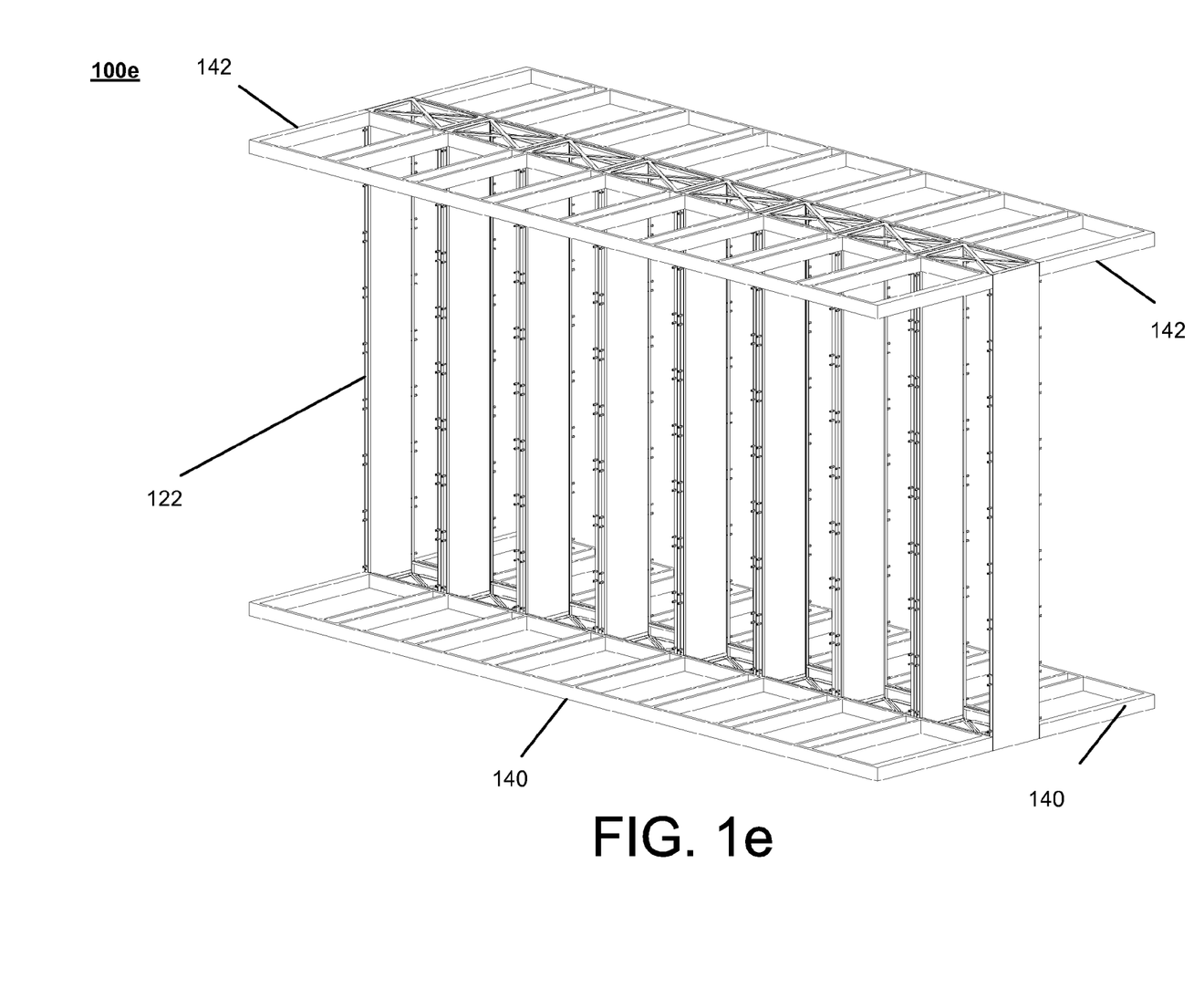

FIG. 1e depicts an example support structure 122 for the plane boards 106 and the electronic device support structure 125. A bottom structural element 140 and a top structural element 142 may be attached, as shown in FIG. 1e. The bottom structural element 140 and top structural element 142 may be configured to provide a reference for tolerance control along a length of the system, wherein the spine (e.g., the support structure 122) and the support element 124 may be attached to the bottom and top structural elements 140, 142.

Figure 1F:
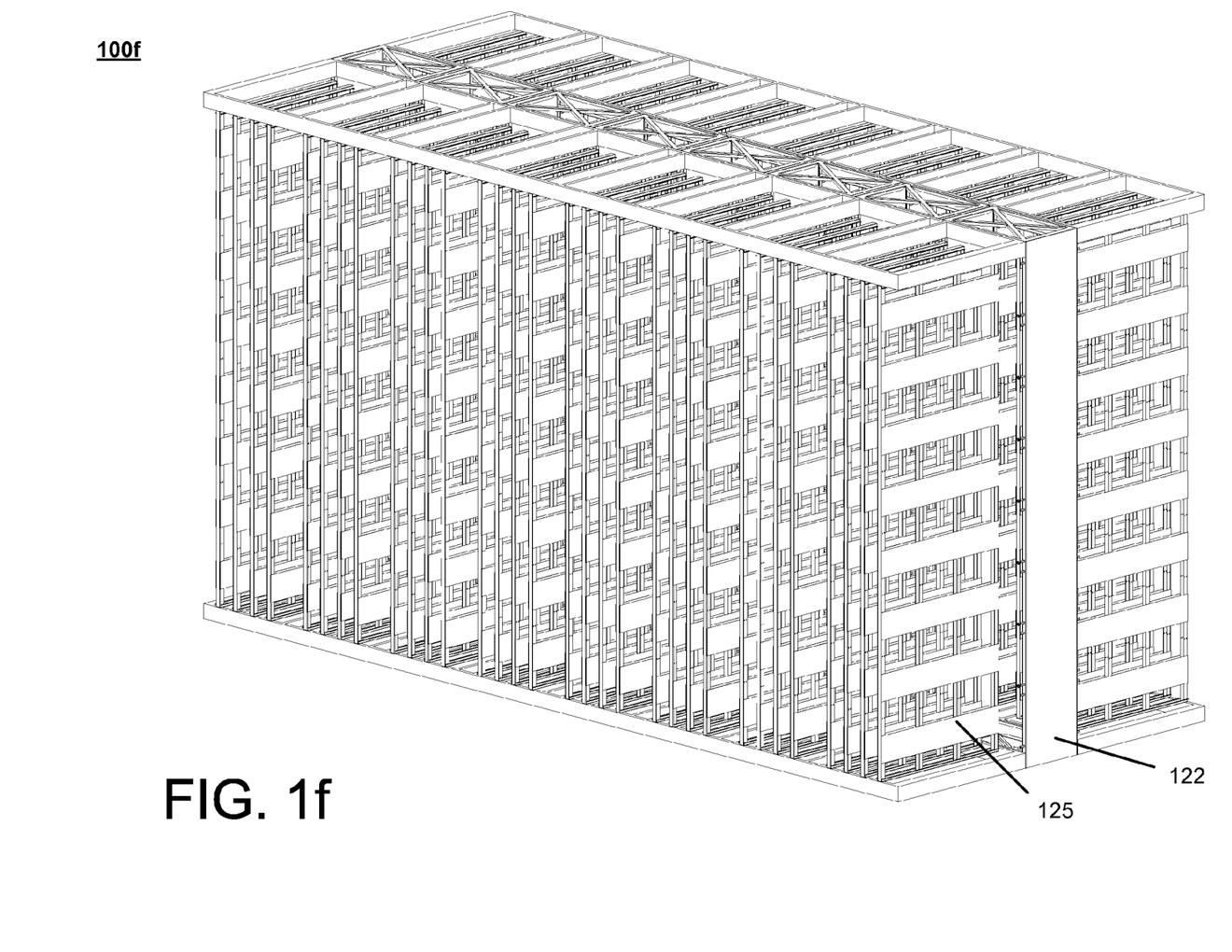

FIG. 1f depicts an example support structure 122 for the plane boards 106 and the electronic device support structure 125.

Figure 1G:
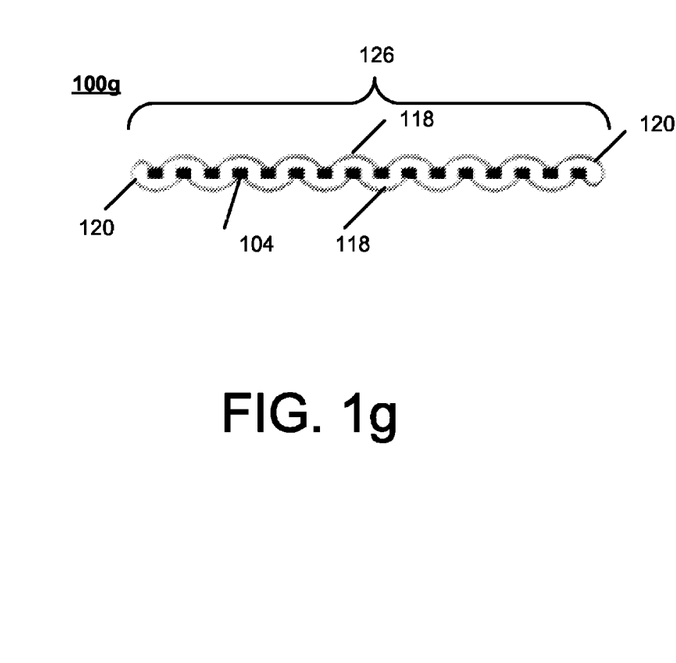

For example, as shown in FIG. 1g, the plurality of interconnection modules 104 may be connected in the second direction via substantially rigid pairwise connections of pairs of the plane boards 106 via a plurality of respective vertical ties 118 and vertical loopback boards 120, based on a skip routing arrangement 126.

For example, the respective electronic devices 108 may include one or more of one or more server devices, or one or more storage devices.

For example, the respective electronic devices 108 may include respective server devices, and the board connection assembly may include a three-dimensional (3D) server rack assembly. Network communication among server devices mounted on the server rack assembly may be provided substantially via interconnected PCBs in lieu of flexible cables and a top-of-rack switch.

III. Flowchart

Figure 2A:
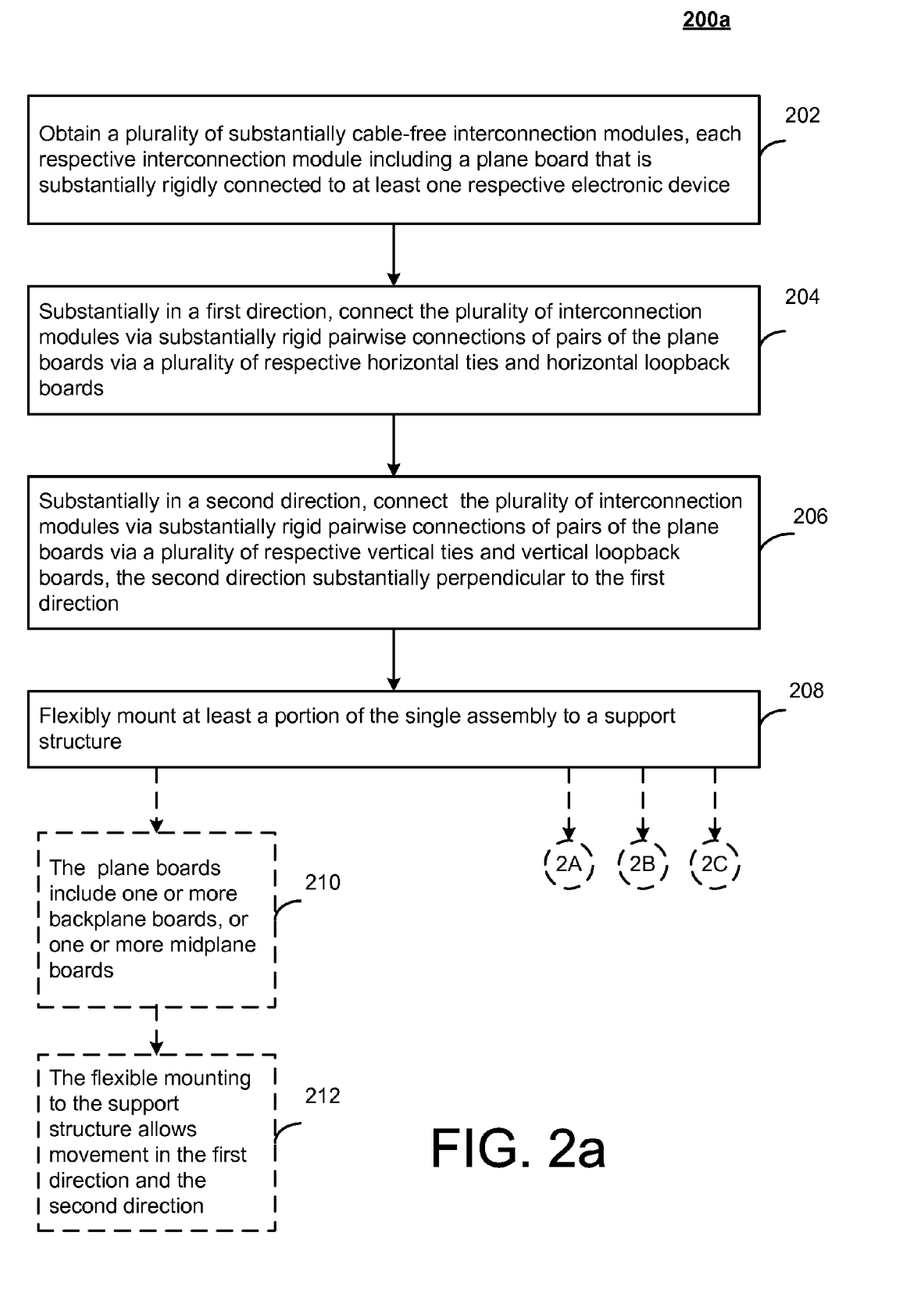
FIGS. 2a-2c are a flowchart illustrating example operations for constructing an example system.
Figure 2B:
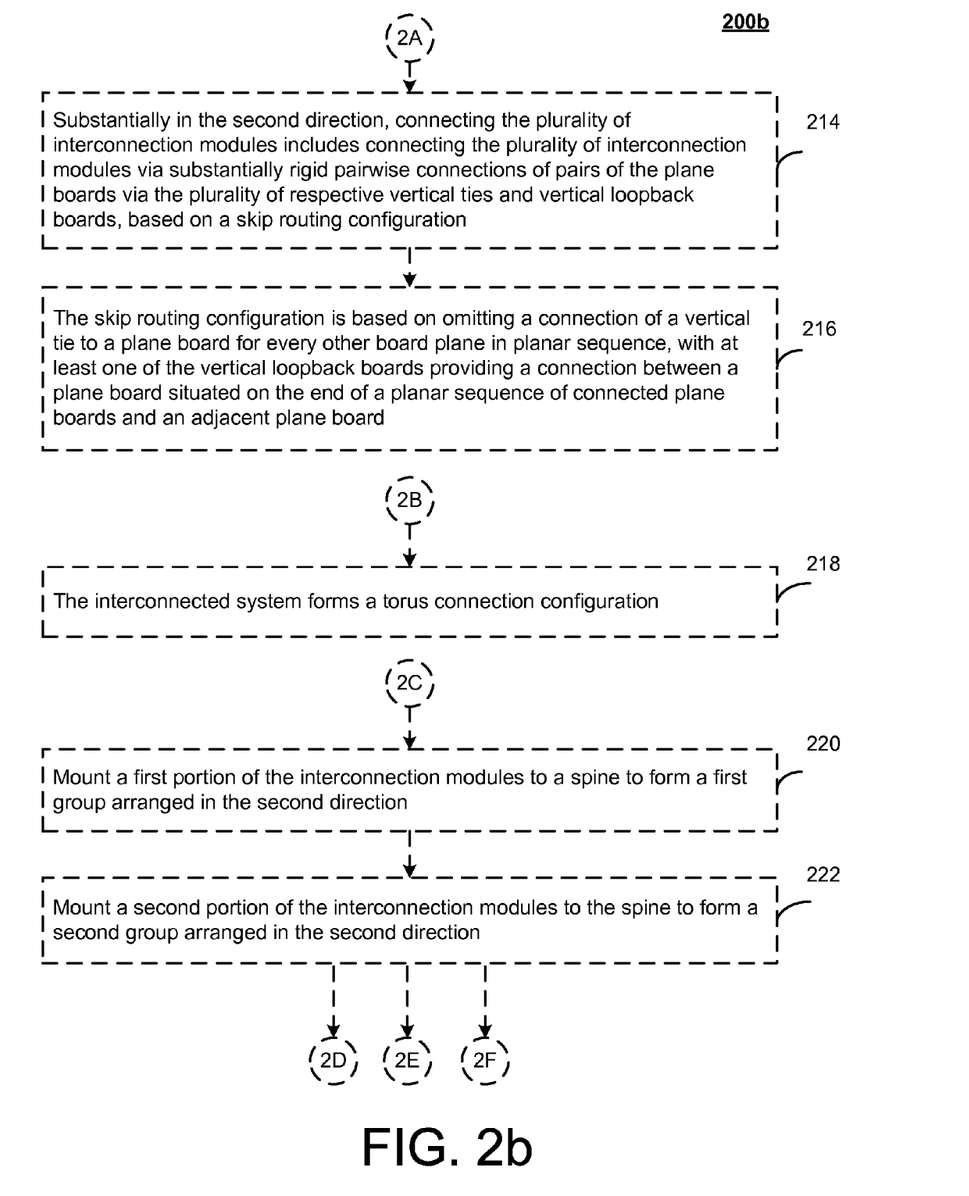
Figure 2C:
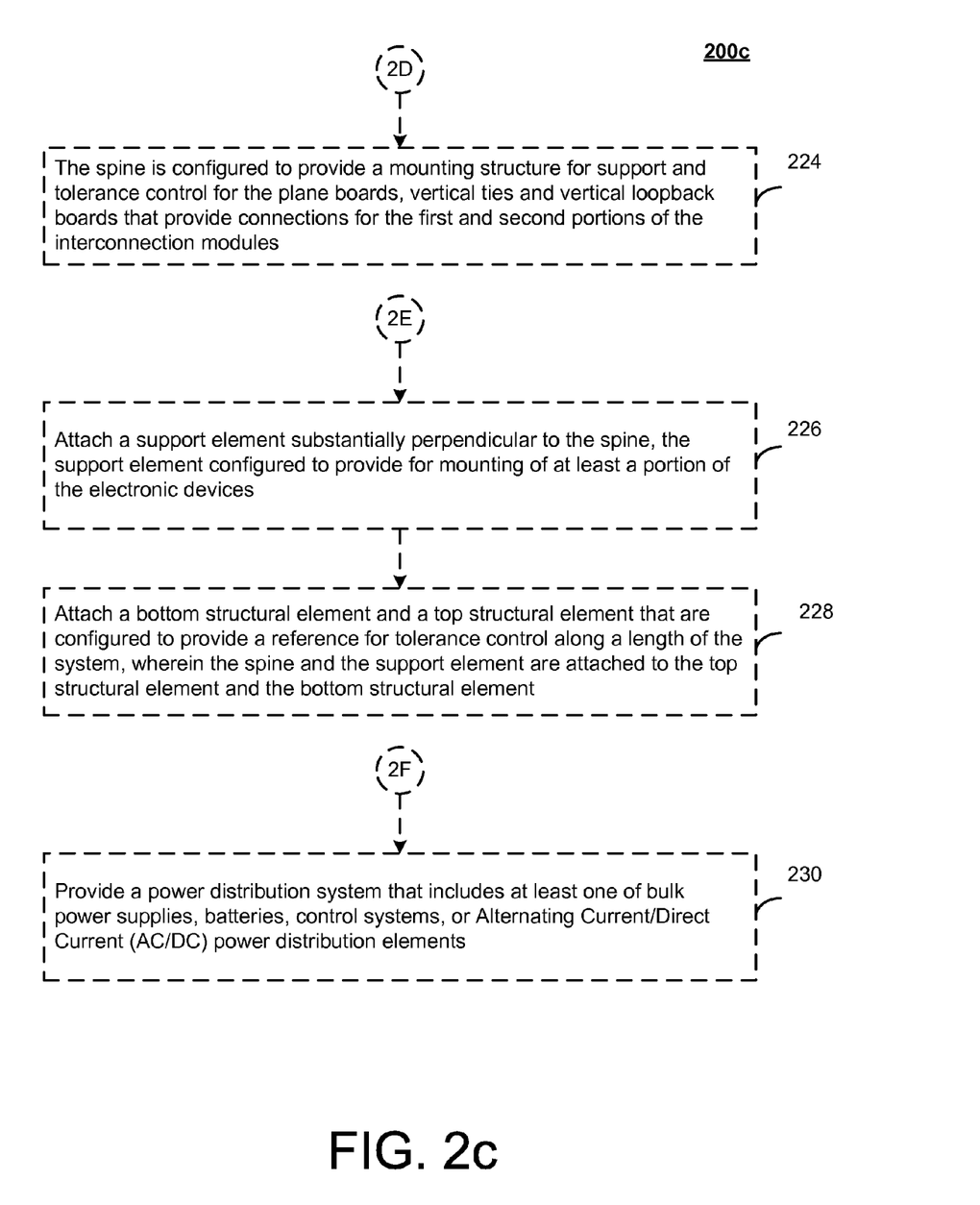

FIGS. 2a-2c are a flowchart illustrating example operations for constructing an example system. For example, a system of printed circuit boards (PCBs) may be interconnected to form a single assembly that is substantially cable-free for interconnecting a plurality of electronic devices 108. In the example of FIG. 2a, a plurality of substantially cable-free interconnection modules 104 may be obtained, each respective interconnection module 104 including a plane board 106 that is substantially rigidly connected to at least one respective electronic device 108 (202).

Substantially in a first direction, the plurality of interconnection modules 104 may be connected via substantially rigid pairwise connections of pairs of the plane boards 106 via a plurality of respective horizontal ties 114 and horizontal loopback boards 116 (204). Substantially in a second direction, the plurality of interconnection modules 104 may be connected via substantially rigid pairwise connections of pairs of the plane boards 106 via a plurality of respective vertical ties 118 and vertical loopback boards 120, the second direction substantially perpendicular to the first direction (206). At least a portion of the single assembly may be flexibly mounted to a support structure (208).

For example, the plane boards 106 may include one or more backplane boards or one or more midplane boards (210). As shown in FIG. 1i, using a midplane configuration, system boards may connect on both sides, while using a backplane configuration, system boards may connect on one side only. As shown in FIG. 1j, two backplane boards may be configured in a stacked configuration such that system boards may connect on both sides.

For example, the flexible mounting to the support structure allows movement in the first direction and the second direction (212).

For example, as indicated in FIG. 2b, connecting the interconnection modules 104 substantially in the second direction may include connecting the plurality of interconnection modules 104 based on a skip routing configuration 126 (214).

For example, the skip routing configuration 126 may be based on omitting a connection of a vertical tie 118 to a plane board 106 on every other plane board 106 in planar sequence, with at least one of the vertical loopback boards 120 providing a connection between a plane board 106 situated on the end of a planar sequence of connected plane boards 106 and an adjacent plane board 106, as shown in FIG. 1g (216).

Figure 1H:
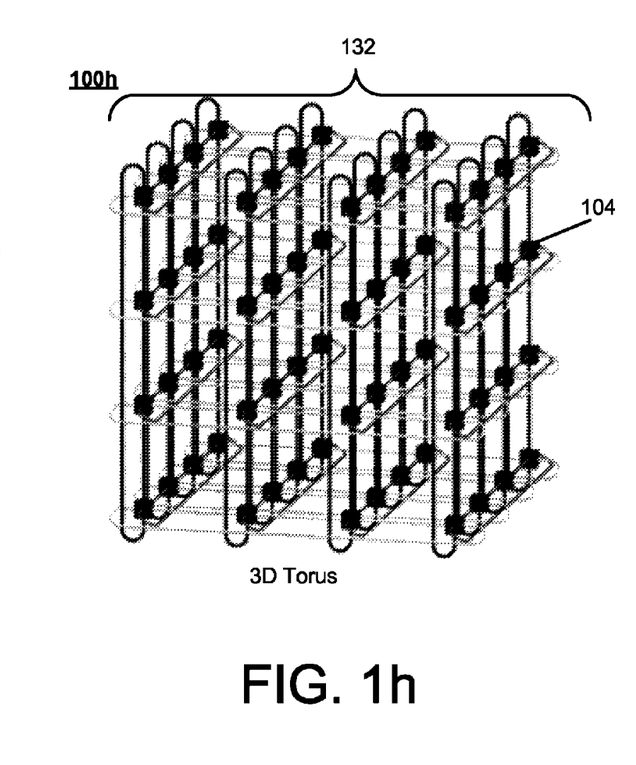
Figure 1I:
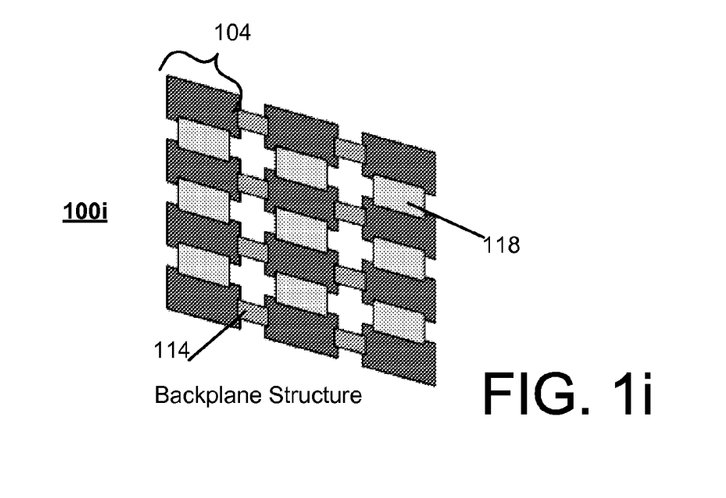
Figure 1J:
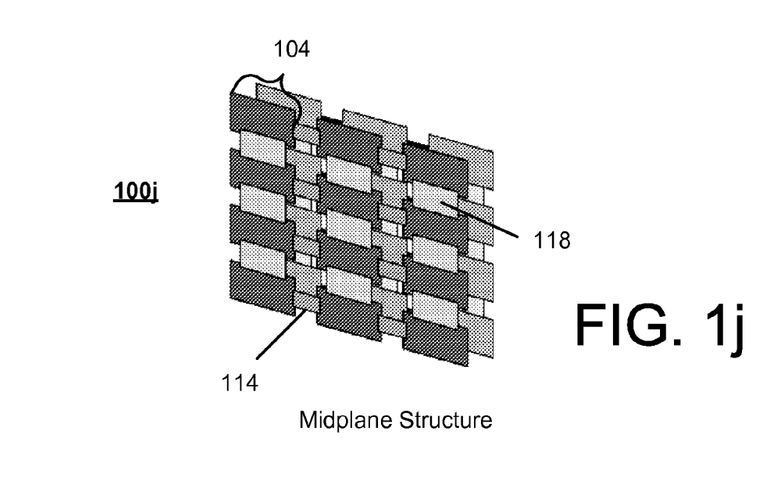

For example, the interconnected system may form a torus connection configuration 132, as shown in FIG. 1h (218). For example, the torus arrangement may include a two-dimensional torus arrangement, a three-dimensional torus arrangement, or any other type of torus arrangement.

For example, a first portion of the interconnection modules 104 may be mounted to a spine 127 to form a first group arranged in the second direction (220). For example, a second portion of the interconnection modules may 104 be mounted to the spine 127 to form a second group arranged in the second direction (222).

For example, as indicated in FIG. 2c, the spine 127 may be configured to provide a mounting structure for support and tolerance control for the plane boards 106, vertical ties 118 and vertical loopback boards 120 that provide connections for the first and second portions of the interconnection modules 104 (224).

For example, the spine 127 may be configured to provide protection for the connectors against movement by one or more other portions of the system.

For example, a support element 124 may be attached substantially perpendicular to the spine 127, the support element 124 configured to provide for mounting of at least a portion of the electronic devices (226).

Figure 1K:
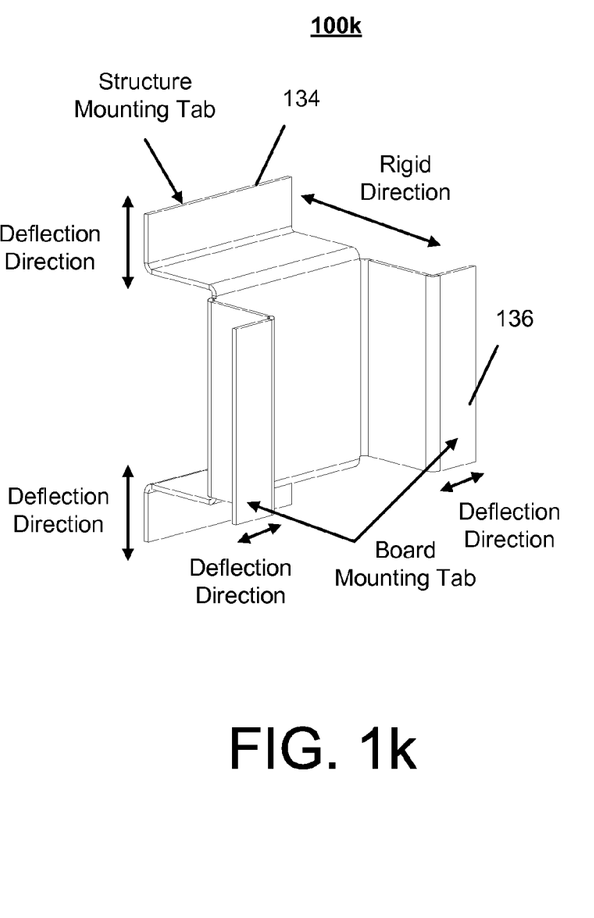

FIG. 1k illustrates a mounting technique in which various boards that make up the interconnect structure may be mounted to the support structure using a connection technique in which the horizontal and vertical directions are flexible but the direction normal to the boards is rigid. As shown in FIG. 1k, two tabs 134 mount to the support structure 122 and two tabs 136 mount to the boards 106. For example, a mounting device 100k may include parts made of various rigid and flexible materials, to provide for the respectively desired rigidity or deflection abilities. For example, a metal such as steel (or any other similar material) may be used with varying thicknesses to provide the desired rigidity or flexibility.

For example, a standoff (not shown) may be used to accomplish a similar attach where the standoff is rigid along the length of the standoff but the top is free to move in a circular path to the other end of the standoff.

As a further example, a bottom structural element 140 and a top structural element 142 may be attached, as shown in FIG. 1e (228). The bottom structural element 140 and top structural element 142 may be configured to provide a reference for tolerance control along a length of the system, wherein the spine (e.g., the support structure 122) and the support element 124 may be attached to the bottom and top structural elements 140, 142.

For example, a power distribution system may be provided (230). For example, the power distribution system may include at least one of bulk power supplies, batteries, control systems, or Alternating Current/Direct Current (AC/DC) power distribution elements.

As discussed above, the interconnect structure is mounted to a support structure. The system may be large, so tolerances and system deflections due to transpiration or installation may become relevant considerations. For example, the interconnect structure may be very rigid, but may be less expensive to construct if it has some flexibility.

If the support structure is flexible and the interconnect structure is rigid, the interconnect structure may connect to the support structure with a flexible connection. Such a connection arrangement with the support structure may allow the interconnect structure to float relative to the support structure.

For example, as discussed above with regard to FIG. 1k, the various boards that make up the interconnect structure mount to the support structure may use a connection technique such that the horizontal and vertical directions are flexible but the direction normal to the boards is rigid. For example, two tabs may mount to the structure and two tabs may mount to the boards. For example, a standoff may be used to accomplish a similar attach where the standoff is rigid along the length of the standoff but the top is free to move in a circular path to the other end of the standoff.

The system boards may utilize a support structure that will support the boards, align them to the interconnect structure during insertion, and allow the system boards to float with the interconnect structure. For example, this may be accomplished by incorporating an alignment mechanism between each of the interconnect boards and the system board support structure. For example, a vertical structure may be used to support to support the boards, as shown in FIG. 1d (discussed above). For example, the structure may incorporate a guide pin receptacle that mates with a guide pin 121 incorporated into an interconnect board.

For example, the other edge of the system board support structure may be supported and aligned to the main structure, the same structure that includes the interconnect support structure. In this manner, the interconnect boards may move side to side with one edge of the system board support following the interconnect boards while the other edge is attached to the main support.

As shown in FIG. 1d, a guide pin 121 may be incorporated in an interconnect board. The guide pin 121 may engage into a corresponding hole on the system board support structure. For example, if multiple interconnect boards engage with the same system board support, only one support guide pin receptacle may be round. The remaining guide pin receptacles may have an oval shape (or other non-round shape) to allow for some tolerance float.

According to an example embodiment, backplanes forming an interconnect structure may be separated, forming a gap between the backplanes within the structure. This gap may be used for various other subsystems such as cooling or support structure. As another example, the backplanes may be directly connected to each other and eliminate the gap.

FIG. 1l depicts example plane boards 106 and electronic devices 108 without structural elements.

One skilled in the art of data processing will understand that there are many ways of constructing interconnected board structures, without departing from the spirit of the discussion herein.

Customer privacy and confidentiality have been ongoing considerations in data processing environments for many years. Thus, example techniques for setting up large-scale systems may use user input and/or data provided by users who have provided permission via one or more subscription agreements (e.g., "Terms of Service" (TOS) agreements) with associated applications or services associated with semantic analysis. For example, users may provide consent to have their input/data transmitted and stored on devices, though it may be explicitly indicated (e.g., via a user accepted text agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in a pure signal such as a pure propagated signal. Such implementations may be referred to herein as implemented via a "computer-readable transmission medium."

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a "computer-readable storage medium" or a "computer-readable storage device" and are thus different from implementations that are purely signals such as pure propagated signals.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable storage medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
    a board connection assembly that includes:
        a plurality of substantially cable-free interconnection modules, each respective interconnection module including a printed circuit board (PCB) plane board that is substantially rigidly connected to at least one respective electronic device; and
        a plurality of connecting PCBs configured to provide substantially all network communication connectivity to the interconnection modules in lieu of flexible cabling, at least a portion of the board connection assembly mounted to a support structure via a flexible connection, wherein:
    connections in a first direction among the interconnection modules are provided by a plurality of horizontal ties and horizontal loopback boards, and
    connections in a second direction among the interconnection modules are provided by a plurality of vertical ties and vertical loopback boards, the second direction substantially perpendicular to the first direction,
    with substantially all connectors among the PCBs included in the system secured in a direction that is perpendicular to respective faces of the interconnection module PCB plane boards, wherein:
        the flexible connection allows movement in the first direction and the second direction.

2. The system of claim 1, wherein:
the plurality of interconnection modules are connected in the second direction via substantially rigid pairwise connections of pairs of the plane boards via a plurality of respective vertical ties and vertical loopback boards, based on a skip routing arrangement.

3. The system of claim 1, wherein:
the respective electronic devices include one or more of:
    one or more server devices, or
    one or more storage devices.

4. The system of claim 1, wherein:
the respective electronic devices include respective server devices, and
the board connection assembly includes a three-dimensional (3D) server rack assembly with network communication among server devices mounted on the server rack assembly provided substantially via interconnected PCBs in lieu of flexible cables and a top-of-rack switch.

5. The system of claim 1, further comprising:
a spine configured to provide a mounting structure for support and tolerance control for at least a portion of the plane boards, vertical ties and vertical loopback boards, wherein the spine is included in the support structure.

6. The system of claim 5, wherein:
the spine is configured to provide protection for the connectors against movement by one or more other portions of the system.

7. A method comprising:
interconnecting a system of printed circuit boards (PCBs) that are interconnected to form a single assembly that is substantially cable-free for interconnecting a plurality of electronic devices, based on:

obtaining a plurality of substantially cable-free interconnection modules, each respective interconnection module including a plane board that is substantially rigidly connected to at least one respective electronic device, substantially in a first direction, connecting the plurality of interconnection modules via substantially rigid pairwise connections of pairs of the plane boards via a plurality of respective horizontal ties and horizontal loopback boards, and substantially in a second direction, connecting the plurality of interconnection modules via substantially rigid pairwise connections of pairs of the plane boards via a plurality of respective vertical ties and vertical loopback boards, the second direction substantially perpendicular to the first direction; and flexibly mounting at least a portion of the single assembly to a support structure.

8. The method of claim 7, wherein the plane boards include one or more of:
one or more backplane boards, or
one or more midplane boards, wherein:
the flexible mounting to the support structure allows movement in the first direction and the second direction.

9. The method of claim 7, wherein:
substantially in the second direction, connecting the plurality of interconnection modules includes connecting the plurality of interconnection modules via substantially rigid pairwise connections of pairs of the plane boards via the plurality of respective vertical ties and vertical loopback boards, based on a skip routing configuration.

10. The method of claim 9, wherein:
the skip routing configuration is based on omitting a connection of a vertical tie to one of the plane boards for every other plane board in planar sequence, with at least one of the vertical loopback boards providing a connection between an end plane board situated on the end of a planar sequence of connected plane boards and an adjacent plane board.

11. The method of claim 7, wherein:
the interconnected system forms a torus connection configuration.

12. The method of claim 7, further comprising:
mounting a first portion of the interconnection modules to a spine to form a first group arranged in the second direction; and
mounting a second portion of the interconnection modules to the spine to form a second group arranged in the second direction, wherein the spine is included in the support structure.

13. The method of claim 12, wherein:
the spine is configured to provide a mounting structure for support and tolerance control for the plane boards, vertical ties, and loopback boards that provide connections for the first and second portions of the interconnection modules.

14. The method of claim 12, further comprising:
attaching a support element substantially perpendicular to the spine, the support element configured to provide for mounting of at least a portion of the electronic devices.

15. The method of claim 14, further comprising:
attaching a bottom structural element and a top structural element that are configured to provide a reference for tolerance control along a length of the system, wherein the spine and the support element are attached to the top structural element and the bottom structural element.

16. The method of claim 12, further comprising:
providing a power distribution system that includes at least one of:
bulk power supplies,
batteries,
control systems, or
Alternating Current/Direct Current (AC/DC) power distribution elements.

17. A system comprising: a substantially cable-free board connection assembly that includes: a plurality of printed circuit boards (PCBs) forming an interconnect plane for a plurality of electronic devices respectively attached to a plurality of plane boards included in the interconnect plane, with an insertion direction for substantially all connectors being substantially perpendicular to a face of the interconnect plane, at least a portion of the board connection assembly being mounted to a support structure via a flexible connection, wherein: horizontal connections among the PCBs are provided by horizontal ties and horizontal loopback boards, and vertical connections among the PCBs are provided by vertical ties and vertical loopback boards.

18. The system of claim 17, further comprising:
a spine configured to provide a mounting structure for support and tolerance control for at least a portion of the plane boards, vertical ties and vertical loopback boards, wherein the spine is included in the support structure.

19. The system of claim 18, wherein:
the spine is configured to provide protection for the connectors against movement by one or more other portions of the system.

20. The system of claim 18, further comprising:
a support element substantially perpendicular to the spine, the support element configured to provide for mounting of at least a portion of the electronic devices.

* * * * *